United States Patent
Hayn et al.

(10) Patent No.: US 9,208,787 B2
(45) Date of Patent: Dec. 8, 2015

(54) METHOD AND DEVICE FOR THE NATURAL-LANGUAGE RECOGNITION OF A VOCAL EXPRESSION

(75) Inventors: Ekkehard Hayn, Grossburgwedel (DE); Klaus-Dieter Liedtke, Nienburg (DE); Guntbert Markefka, Hannover (DE)

(73) Assignee: Deutsche Telekom AG, Bonn (DE)

( * ) Notice: Subject to any disclaimer, the term of this patent is extended or adjusted under 35 U.S.C. 154(b) by 1272 days.

(21) Appl. No.: 12/306,350

(22) PCT Filed: Jun. 14, 2007

(86) PCT No.: PCT/EP2007/005224
§ 371 (c)(1),
(2), (4) Date: Dec. 29, 2009

(87) PCT Pub. No.: WO2008/000353
PCT Pub. Date: Jan. 3, 2008

(65) Prior Publication Data
US 2010/0114577 A1     May 6, 2010

(30) Foreign Application Priority Data
Jun. 27, 2006   (DE) .......................... 10 2006 029 755

(51) Int. Cl.
*G10L 15/00*   (2013.01)
*G10L 15/32*   (2013.01)
*G10L 15/19*   (2013.01)

(52) U.S. Cl.
CPC ................. *G10L 15/32* (2013.01); *G10L 15/19* (2013.01)

(58) Field of Classification Search
CPC ................................. G10L 2015/085
USPC .......................................................... 704/257
See application file for complete search history.

(56) References Cited

U.S. PATENT DOCUMENTS

| 6,499,013 | B1 |   | 12/2002 | Weber |
| 6,964,020 | B1 | * | 11/2005 | Lundy ........................... 715/210 |
| 7,184,957 | B2 | * | 2/2007 | Brookes et al. ............... 704/246 |
| 2001/0011218 | A1 | * | 8/2001 | Phillips et al. ................ 704/256 |
| 2001/0020226 | A1 | * | 9/2001 | Minamino et al. ............ 704/251 |

(Continued)

FOREIGN PATENT DOCUMENTS

| CN | 1325528 | 12/2001 |
| DE | 699 23 191 | 1/2006 |

(Continued)

OTHER PUBLICATIONS

German Office Action dated Jun. 19, 2007 in corresponding German Application No. 10 2006 029 755.5, together with an English language translation of such German Office Action.

(Continued)

*Primary Examiner* — Jakieda Jackson
(74) *Attorney, Agent, or Firm* — Faegre Baker Daniels LLP

(57) ABSTRACT

The invention relates to a method and a device for the natural-language recognition of a vocal expression. A vocal expression of a person is detected and converted into a voice signal to be processed by a voice recognition device. Afterwards, the voice signal is analyzed at the same time or sequentially in a plurality of voice recognition branches of the voice recognition device using a plurality of grammars, wherein the recognition process is successfully completed if the analysis of the voice signal in at least one voice recognition branch supplies a positive recognition result.

23 Claims, 2 Drawing Sheets

(56) References Cited

U.S. PATENT DOCUMENTS

| | | | |
|---|---|---|---|
| 2002/0055845 A1 | 5/2002 | Ueda et al. | |
| 2002/0107695 A1* | 8/2002 | Roth et al. | 704/275 |
| 2002/0133346 A1 | 9/2002 | Kemble et al. | |
| 2003/0105741 A1* | 6/2003 | Bouthors | 707/1 |
| 2003/0182131 A1 | 9/2003 | Arnold et al. | |
| 2004/0158468 A1* | 8/2004 | Baker | 704/238 |
| 2004/0220809 A1* | 11/2004 | Wang et al. | 704/257 |
| 2004/0254791 A1* | 12/2004 | Coifman et al. | 704/246 |
| 2005/0097364 A1* | 5/2005 | Edeki et al. | 713/201 |
| 2005/0187771 A1* | 8/2005 | Gong | 704/256.6 |
| 2005/0203751 A1* | 9/2005 | Stevens et al. | 704/276 |
| 2006/0184360 A1* | 8/2006 | Murveit et al. | 704/231 |
| 2006/0190255 A1* | 8/2006 | Fukada | 704/251 |
| 2007/0005361 A1 | 1/2007 | Huning et al. | |
| 2007/0050190 A1* | 3/2007 | Washio et al. | 704/249 |
| 2007/0179778 A1* | 8/2007 | Gong et al. | 704/9 |
| 2007/0182595 A1* | 8/2007 | Ghasabian | 341/22 |
| 2007/0265849 A1* | 11/2007 | Grost et al. | 704/257 |

FOREIGN PATENT DOCUMENTS

| | | |
|---|---|---|
| DE | 10 2005 030 967 | 1/2007 |
| WO | 00/14727 | 3/2000 |
| WO | 00/14728 | 3/2000 |
| WO | 00/58945 | 10/2000 |
| WO | 01/78065 | 10/2001 |

OTHER PUBLICATIONS

Chinese Examination Report dated Oct. 28, 2010 in corresponding Chinese Application No. 2010022400943550.

Office Action dated Feb. 17, 2012 in corresponding Chinese Application No. 200780024659.9 together with English language translation of same.

* cited by examiner

METHOD AND DEVICE FOR THE NATURAL-LANGUAGE RECOGNITION OF A VOCAL EXPRESSION

CROSS-REFERENCE TO RELATED APPLICATION

This application is related to and claims the benefit under 35 U.S.C. §119 and 35 U.S.C. §365 of International Application No. PCT/EP2007/005224, filed Jun. 14, 2007.

The invention relates to a method and a device for the natural language recognition of a vocal expression, in particular on the basis of a speech recognition system which for example can be executed on an electronic data processing system.

Speech recognition systems are provided for use in various application areas. For example speech recognition systems are used in combination with office applications for detection of texts or in combination with technical devices for their control and command input. Speech recognition systems are also used for the control of information and communications devices such as e.g. radio, mobile telephones and navigation systems. Moreover, companies use language dialog systems for customer service and information, said systems also being based on speech recognition systems. The patent application is related to the latter.

In the process in the case of the automatic speech recognition system for the assessment of word sequences so-called speech models are used, which are based on a grammatical set of rules, also referred to as a grammar. The grammars define unambiguous sets of rules. Speech recognition systems based on grammars exhibit high recognition reliability.

In particular in the case of customer service in the technical area, for example in connection with mobile telephones and tariffs, more and more efficient speech recognition systems are called for. In order to understand the countless customer expressions, very large grammars are required, whose comprehensiveness is to the disadvantage of the recognition reliability.

Every automated language recognition process is based on the comparison of a concrete call expression with stored words or statements. Only in the case of a match is an expression considered to be recognized and can trigger a specified action. However, a "grammar dilemma" arises from this: small grammars have a low scope of recognition, but to make up for this a better recognition reliability. Large grammars conversely cover a great expression spectrum, while the recognition reliability sinks.

The object of the invention therefore lies in realizing a language recognition method and system with a large scope of recognition with low scope of the grammar. Hence what is wanted is a grammar model which uses the positive aspects of large and small grammars without connoting their negative aspects.

This task is solved in accordance with the invention by a method and a device with the features of the independent patent claims.

Preferred embodiments and additional advantageous features of the invention arise from the dependent claims.

The inventive method is based on the detection of a vocal expression of a person and conversion into a voice signal to be processed by a speech recognition device, the analysis of the voice signal at the same time or sequentially in a plurality of speech recognition branches of the speech recognition device using a plurality of grammars, and the successful completion of the detection process, if the analysis of the voice signal supplies a positive recognition result in at least one speech recognition branch.

In a first embodiment of the invention a simultaneous analysis of the vocal expression takes place by two or more independent grammars. In this case two or more simultaneous recognition processes are initiated by the vocal expression of a person, said recognition processes analyzing and assessing the vocal expression independently from each other. For example, a comparably small main grammar with a low scope of recognition is placed alongside a more comprehensive secondary grammar with an expanded scope of recognition. Both grammars are without common intersection.

A second embodiment of the invention relates to a grammar cascade. In the case of this model various grammars are used one after the other, that is, sequentially. At the moment in which a grammar supplies a recognition result, the cascade is exited and the recognition process is concluded. In the case of this method 100% of all expressions to be recognized are compared to the first grammar. Depending on efficiency and arrangement of this grammar a portion of for example 20% of non-recognized expressions are forwarded to a second recognition step. For the case that a third recognition step is integrated, it can be assumed that a portion of for example 5% of all incoming expressions reach this third recognition step.

With both recognition methods a comprehensive expression spectrum is supposed to be covered with a plurality of "smaller" grammars, which, however, in combination guarantee a great recognition reliability. This can happen as described above in the form of a simultaneous or a successive recognition process.

The two preferred exemplary embodiments of the invention will be described in the following with the help of the drawings.

Figure 1:
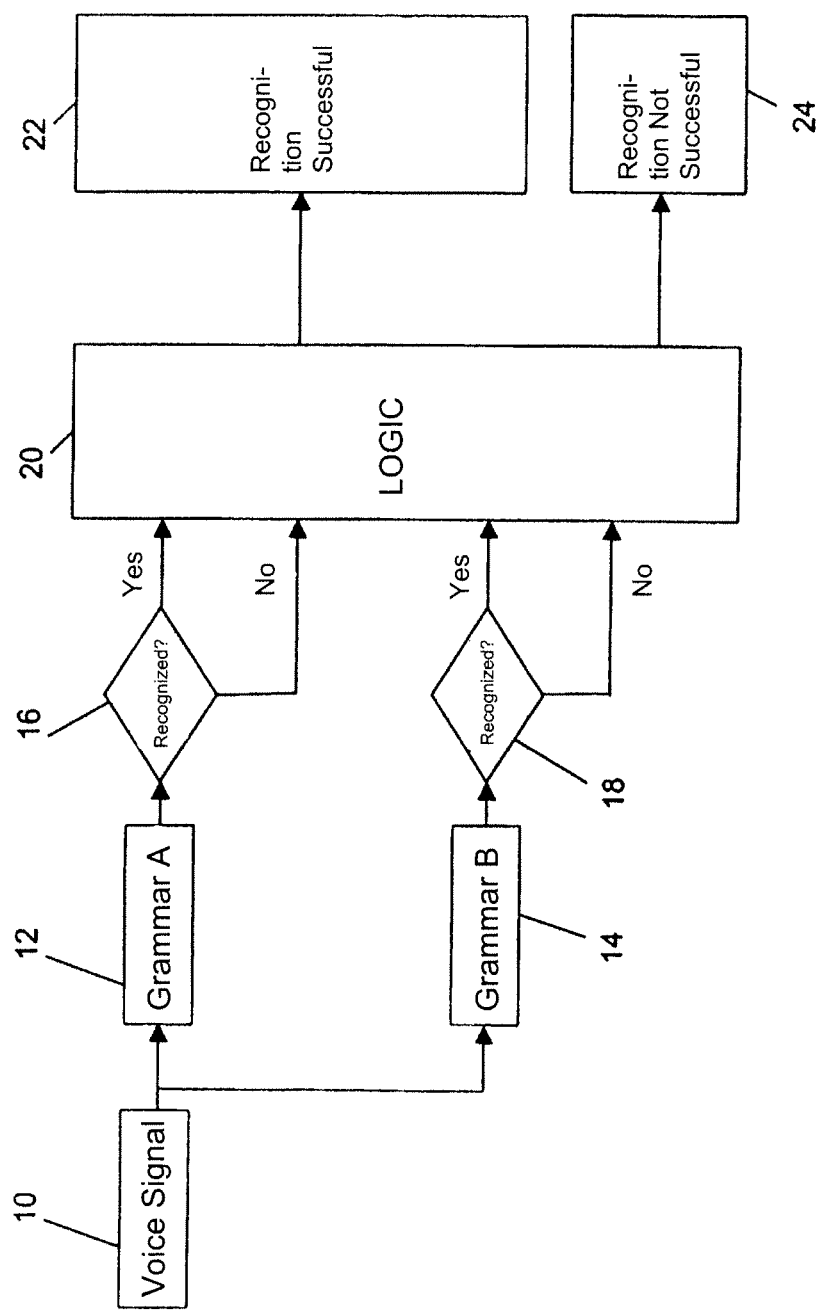
FIG. 1 shows schematically a first embodiment of the speech recognition system with speech recognition branches working parallel.

In accordance with FIG. 1 a vocal expression of a person which is present as a voice signal 10, is simultaneously fed to two speech recognition branches and analyzed by two grammars 12 and 14 (Grammar A and Grammar B). The two grammars 12, 14 have no common intersection, that is, they are based on different sets of rules. Through the parallel processing of the voice signal the analysis expenditure increases and with it the necessary computing load in the application of the method on a computer. This circumstance is however compensated for by the more rapid recognition and significantly improved recognition reliability.

A comparison 16 of the voice signal to the grammar (A) 12 leads either to a positive recognition result (Yes) or a negative recognition result (No). Likewise a comparison 18 of the voice signal to the grammar (B) 14 leads either to a positive recognition result (Yes) or a negative recognition result (No). Within the scope of the recognition process with the simultaneously working grammars 12, 14 four possible recognition cases arise, which can be evaluated with the different methods by logic 20.

| Recognition case | Grammar 1 (Main grammar) | Grammar 2 (Secondary grammar) | Overall result |
|---|---|---|---|
| 1 | No result (No) | No result (No) | Not recognized |

-continued

| Recognition case | Grammar 1 (Main grammar) | Grammar 2 (Secondary grammar) | Overall result |
|---|---|---|---|
| 2 | Result (Yes) | No result (No) | Recognized |
| 3 | No result (No) | Result (Yes) | Recognized |
| 4 | Result (Yes) | Result (Yes) | Recognized |

The recognition cases 1 through 3 are unproblematic insofar as they supply unambiguous results: Case 1 forces a non-recognition of the voice signal and with that a rejection, Position 24. Cases 2 and 3 supply only one positive result each and with this unambiguous clearly indicate a recognition of the voice signal, Position 22.

For case 4, in which both grammars 12, 14 have recognized the voice signal 10, on the other hand, a special method logic must be implemented, since the result is not unambiguous. Said method logic can rigidly decide in favor of grammar 12, can be oriented to the recognition reliability (Confidence Level) or form a hybrid of both (e.g.: result from grammar 14 is only used if recognition reliability is higher than in the case of grammar 12 by a predefined value).

In place of two parallel speech recognition branches in accordance with the invention three or more parallel working speech recognition branches can also be provided.

Figure 2:
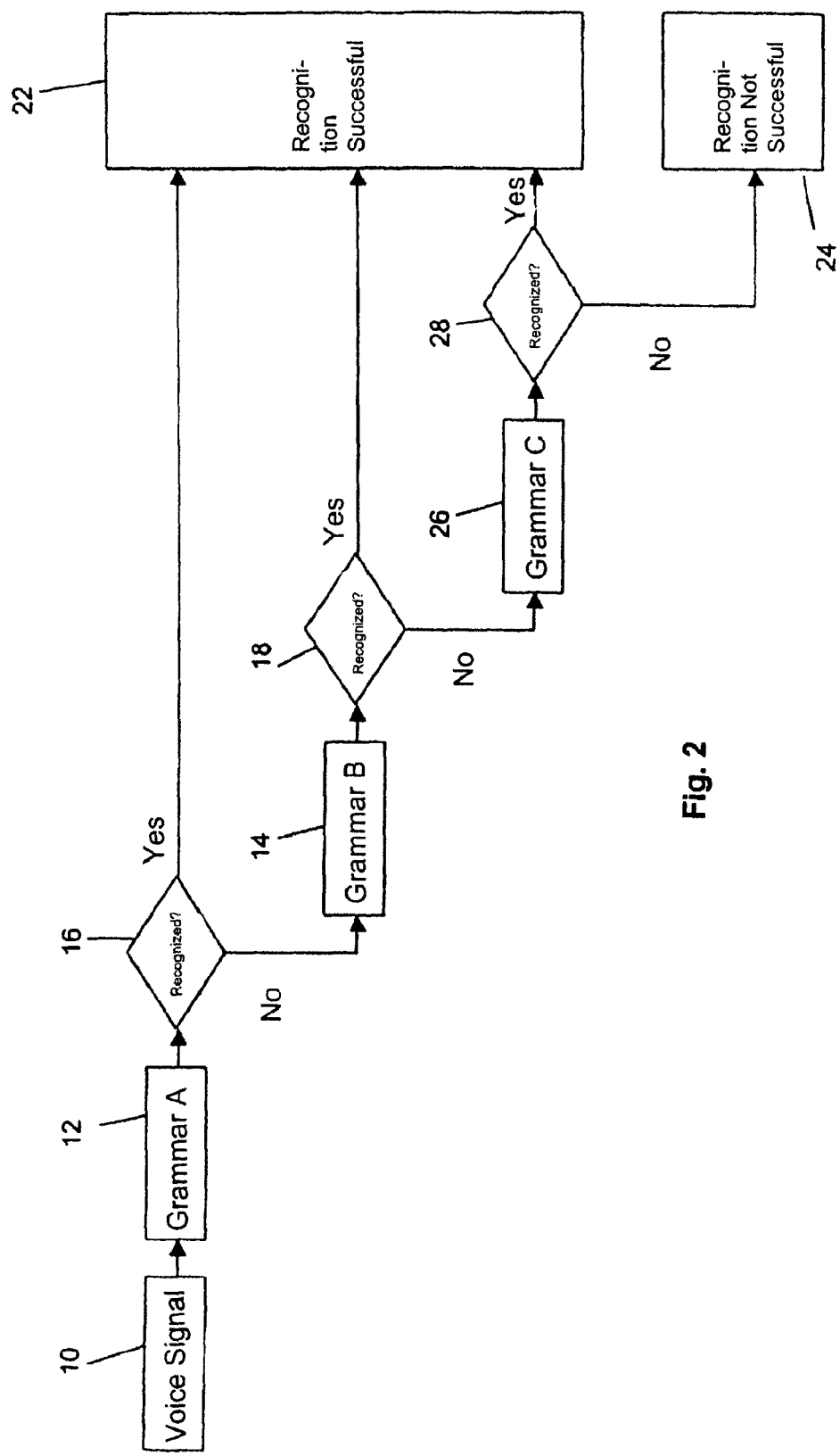
FIG. 2 shows schematically a second embodiment of the speech recognition system with sequentially working, cascaded speech recognition systems.

FIG. 2 shows another preferred embodiment of the invention. Here there are several grammars 12, 14 and 26 (Grammars A, B and C) connected sequentially to each other in the form of a cascade. That is, in the case of the grammar cascade the various grammars 12, 14 and 26 are not addressed simultaneously, but rather successively. Schematically the recognition operation can be described in the following manner: At the moment in which a grammar supplies a positive recognition result, the cascade is exited and the recognition process is concluded, Position 22.

The voice signal 10 is first fed to a first grammar (A) 12 and analyzed there. A comparison 16 of the voice signal to the grammar (A) 12 leads either to a positive recognition result (Yes), in which case the recognition process is successfully concluded, or a negative recognition result (No), in which case the voice signal is fed to a second grammar (B) 14 for further analysis. A comparison 18 of the voice signal 10 to the second grammar (B) 14 leads either to a positive recognition result (Yes), in which case the recognition process is successfully concluded, or a negative recognition result (No), in which case the voice signal is fed to a third grammar (C) 26 for further analysis. A comparison 28 of the voice signal to the third grammar (C) 26 leads either to a positive recognition result (Yes), in which case the recognition process is successfully concluded, or a negative recognition result (No), in which case the voice signal is rejected as not recognized, Position 24.

In the case of these methods first 100% of all incoming voice signals 10 are compared to the first grammar 12. Depending on efficiency and design of this grammar, a portion of the vocal expressions will not be recognized. These non-recognized voice signals are thereupon further submitted to the second recognition step. Depending on efficiency and design of the second recognition step, the voice signals are thereupon further submitted to the third recognition step.

The advantage of the grammar cascade vis-à-vis the method of simultaneous recognition by a plurality of grammars lies in the fact that there is no additional computing load, since the voice signal 10 is only compared with one grammar at any point in time. Through the successive recognition however there is necessarily an increase in the latency period in the system.

In place of three cascaded speech recognition branches in accordance with the invention four or more sequentially working speech recognition branches can also be provided.

LIST OF THE REFERENCE SYMBOLS

10 Voice signal
12 Grammar A
14 Grammar B
18 Branch A
20 Branch B
22 Recognition successful
24 Recognition not successful
26 Grammar C
28 Branch C

The invention claimed is:

1. A method for the natural language recognition of a vocal expression, comprising the following steps:
   detection of the vocal expression and conversion into a voice signal to be processed by a speech recognition device,
   sequential analysis of the voice signal in a plurality of speech recognition branches of the speech recognition device using a plurality of grammars, and
   successful completion of the recognition process of the vocal expression, in the case where the analysis of the voice signal supplies a positive recognition result in at least one speech recognition branch,
   characterized by the following steps:
   a) feeding of the entire voice signal to a first speech recognition branch comprising a first grammar for analysis of the voice signal,
   b) analysis of the entire voice signal by the first grammar, wherein in the case of a recognition of the entire vocal signal a positive first recognition is generated and the recognition process is concluded and in the case of a non-recognition of the entire vocal signal a negative first recognition result is generated for a non-recognized portion of the voice signal,
   c) wherein in the case of negative recognition result the non-recognized portion of the voice signal is fed to a further speech recognition branch comprising a further grammar,
   d) analysis of the non-recognized portion of the voice signal by the further grammar, wherein in the case of a recognition of the entire non-recognized portion of the voice signal a positive recognition is generated and the recognition process is concluded and in the case of a non-recognition of the entire non-recognized portion of the voice signal a negative recognition result is generated for a remaining non-recognized portion of the voice signal, and
   e) wherein in the case of a negative recognition result in step (d) the method continues with step (c) until the grammars of all existing speech recognition branches have been run.

2. The method according to claim 1, characterized in that the sets of rules of the grammars do not exhibit a common intersection.

3. The method according to claim 2, characterized in that a first grammar analyzes most recognized vocal expressions, a second grammar analyzes less recognized vocal expressions and any further grammar analyzes even less recognized vocal expressions.

4. The method according to claim 2, characterized in that when both the first and the second recognition result are positive, the recognition result supplied by the first grammar is used.

5. The method according to claim 2, characterized in that when both the first and the second recognition result are positive, the recognition result whose recognition reliability is the greatest is used.

6. A non-transitory computer readable medium having stored thereon a computer program executed by one or more processors that causes the processors to perform the method according to claim 2.

7. A computer program product which comprises a non-transitory computer readable medium having stored thereon a computer program executable by one or more processors that causes the processors to perform the method according to claim 2.

8. The method according to claim 1, characterized in that when both the first and the second recognition result are positive, the recognition result supplied by the first grammar is used.

9. A non-transitory computer readable medium having stored thereon a computer program executed by one or more processors that causes the processors to perform the method according to claim 8.

10. A computer program product which comprises a non-transitory computer readable medium having stored thereon a computer program executable by one or more processors that causes the processors to perform the method according to claim 8.

11. The method according to claim 1, characterized in that when both the first and the second recognition result are positive, the recognition result whose recognition reliability is the greatest is used.

12. A non-transitory computer readable medium having stored thereon a computer program executed by one or more processors that causes the processors to perform the method according to claim 11.

13. A non-transitory computer readable medium having stored thereon a computer program executed by one or more processors that causes the processors to perform the method according to claim 1.

14. A computer program product which comprises a non-transitory computer readable medium having stored thereon a computer program executable by one or more processors that causes the processors to perform the method according to claim 1.

15. The method according to claim 1, characterized in that when both the first and the second recognition result are positive, the recognition result supplied by the first grammar is used.

16. The method according to claim 1, characterized in that when both the first and the second recognition result are positive, the recognition result whose recognition reliability is the greatest is used.

17. A non-transitory computer readable medium having stored thereon a computer program executed by one or more processors that causes the processors to perform the method according to claim 1.

18. A computer program product which comprises a non-transitory computer readable medium having stored thereon a computer program executable by one or more processors that causes the processors to perform the method according to claim 1.

19. A device for the natural language recognition of a vocal expression converted into a voice signal, the device comprising:
   a speech recognition device with a plurality of speech recognition branches, wherein each voice recognition branch exhibits a grammar for the analysis of the voice signal, wherein the voice signal is fed to the speech recognition branches sequentially, wherein the speech recognition device in a recognition process sequentially analyzes the voice signal with the plurality of speech recognition branches by:
   a) feeding of the entire voice signal to a first speech recognition branch of the plurality of speech recognition branches comprising a first grammar for analysis of the voice signal,
   b) analysis of the entire voice signal by the first grammar, wherein in the case of a recognition of the entire vocal signal a positive first recognition is generated and the recognition process is concluded and in the case of a non-recognition of the entire vocal signal a negative first recognition result is generated for a non-recognized portion of the voice signal,
   c) wherein in the case of negative recognition result the non-recognized portion of the voice signal is fed to a further speech recognition branch of the plurality of speech recognition branches comprising a further grammar,
   d) analysis of the non-recognized portion of the voice signal by the further grammar, wherein in the case of a recognition of the entire non-recognized portion of the voice signal a positive recognition is generated and the recognition process is concluded and in the case of a non-recognition of the entire non-recognized portion of the voice signal a negative recognition result is generated for a remaining non-recognized portion of the voice signal, and
   e) wherein in the case of a negative recognition result in step (d) the speech recognition device continues with step (c) until the grammars of all of the plurality of speech recognition branches have been run.

20. The device of claim 19, wherein the non-recognized portion of the voice signal is automatically fed to the further speech recognition branch comprising the further grammar.

21. A method for the natural language recognition of a vocal expression, comprising the following steps:
   detection of the vocal expression and conversion into a voice signal to be processed by a speech recognition device,
   sequential analysis of the voice signal in a plurality of speech recognition branches of the speech recognition device using a plurality of grammars, and
   successful completion of the recognition process of the vocal expression, in the case where the analysis of the voice signal supplies a positive recognition result in at least one speech recognition branch,
   characterized by the following steps:
   a) feeding of the entire voice signal to a first speech recognition branch comprising a first grammar for analysis of the voice signal,
   b) analysis of the entire voice signal by the first grammar, wherein in the case of a recognition of the entire vocal signal a positive first recognition is generated and the recognition process is concluded and in the case of a non-recognition of the entire vocal signal a negative first recognition result is generated for a non-recognized portion of the voice signal, c) wherein in the case of negative recognition result the non-recognized portion of the voice signal is fed to a further speech recognition branch comprising a further grammar, d) analysis of the non-recognized portion of the voice signal by the further grammar, wherein in the case of a recognition of the entire non-recognized portion of the voice signal a positive recognition is generated and the recognition process is concluded and in the case of a non-recognition of the entire non-recognized portion of the voice signal a negative recognition result is generated for a remaining non-recognized portion of the voice signal, and e) wherein in the case of a negative recognition result in step (d) the method continues with step (c) until the grammars of all existing speech recognition branches have been run; and wherein a first grammar analyzes most recognized vocal expressions, a second grammar analyzes less recognized vocal expressions and any further grammar analyzes even less recognized vocal expressions.

22. The method of claim 1, wherein the non-recognized portion of the voice signal is automatically fed to the further speech recognition branch comprising the further grammar.

23. The method of claim 21, wherein the non-recognized portion of the voice signal is automatically fed to the further speech recognition branch comprising the further grammar.

* * * * *